(12) United States Patent
Wu

(10) Patent No.: US 12,150,581 B2
(45) Date of Patent: Nov. 26, 2024

(54) JUICE EXTRACTOR

(71) Applicant: QANYAN INTELLIGENT TECHNOLOGY(NINGBO)CO., LTD, Zhejiang (CN)

(72) Inventor: Zhenyu Wu, Liaoning (CN)

(73) Assignee: QANYAN INTELLIGENT TECHNOLOGY (NINGBO) CO., LTD, Ningbo (CN)

( * ) Notice: Subject to any disclaimer, the term of this patent is extended or adjusted under 35 U.S.C. 154(b) by 663 days.

(21) Appl. No.: 15/733,651

(22) PCT Filed: Apr. 7, 2020

(86) PCT No.: PCT/CN2020/083498
§ 371 (c)(1),
(2) Date: Jul. 29, 2021

(87) PCT Pub. No.: WO2020/228445
PCT Pub. Date: Nov. 19, 2020

(65) Prior Publication Data
US 2021/0353089 A1 Nov. 18, 2021

(30) Foreign Application Priority Data

May 16, 2019 (CN) .......................... 201910407676.5
May 16, 2019 (CN) .......................... 201910407677.X

(51) Int. Cl.
*A47J 19/02* (2006.01)
*A47J 19/06* (2006.01)
(Continued)

(52) U.S. Cl.
CPC ............. *A47J 19/025* (2013.01); *A47J 19/06* (2013.01); *B30B 9/16* (2013.01); *H02K 5/10* (2013.01); *H02K 5/24* (2013.01)

(58) Field of Classification Search
CPC .......... A47J 19/025; A47J 19/06; H02K 5/10; H02K 7/116; H02K 7/14; H02K 5/24
See application file for complete search history.

(56) References Cited

U.S. PATENT DOCUMENTS

2007/0277682 A1* 12/2007 Wong ..................... A47J 19/025
99/495
2014/0245906 A1* 9/2014 Lee .......................... A23N 1/00
99/510

(Continued)

FOREIGN PATENT DOCUMENTS

AU    2007261880 A1    12/2007
CN      201767733 U     3/2011
(Continued)

*Primary Examiner* — Thien S Tran
(74) *Attorney, Agent, or Firm* — LKGlobal | Lorenz & Kopf, LLP

(57) ABSTRACT

A juice extractor includes a power assembly, a housing assembly, a snap-fitting assembly and a screw assembly; the power assembly includes an electric motor, an electric-motor housing and a rotation shaft, and the electric motor drives the rotation shaft to rotate; the screw assembly is connected to the rotation shaft, and is provided inside the housing assembly; the snap-fitting assembly connects the housing assembly to the power assembly; and the housing assembly includes a strainer assembly and a filtering-shield assembly, the strainer assembly is integrally formed by welding, the filtering-shield assembly is detachably fixed to and supported on the strainer assembly, and the filtering-shield assembly is provided with a filtered-juice separating slot that is capable of performing secondary filtration of an extracted juice. The present disclosure employs a novel structure, which has a good sealing performance, and a low manufacturing cost, and the mouthfeel of the extracted juice is better.

18 Claims, 6 Drawing Sheets

(51) Int. Cl.
  *B30B 9/16*    (2006.01)
  *H02K 5/10*    (2006.01)
  *H02K 5/24*    (2006.01)

(56) References Cited

U.S. PATENT DOCUMENTS

| | | | | |
|---|---|---|---|---|
| 2015/0257571 | A1* | 9/2015 | Shen | A47J 19/06 |
| | | | | 99/495 |
| 2020/0282372 | A1* | 9/2020 | Liu | A47J 19/00 |
| 2021/0353089 | A1 | 11/2021 | Wu | |

FOREIGN PATENT DOCUMENTS

| | | |
|---|---|---|
| CN | 202425568 U | 9/2012 |
| CN | 103381048 A | 11/2013 |
| CN | 103906454 A | 7/2014 |
| CN | 203802226 U | 9/2014 |
| CN | 204133101 U | 2/2015 |
| CN | 104382471 A | 3/2015 |
| CN | 204442067 U | 7/2015 |
| CN | 204764918 U | 11/2015 |
| CN | 204970780 U | 1/2016 |
| CN | 205118234 U | 3/2016 |
| CN | 205457981 U | 8/2016 |
| CN | 205565966 U | 9/2016 |
| CN | 106580036 A | 4/2017 |
| CN | 206565840 U | 10/2017 |
| CN | 208192729 U | 12/2018 |
| CN | 208784342 U | 4/2019 |
| CN | 208822285 U | 5/2019 |
| CN | 110141102 A | 8/2019 |
| CN | 110150948 A | 8/2019 |
| CN | 210582097 U | 5/2020 |
| CN | 211354928 U | 8/2020 |
| EP | 3090662 A1 | 11/2016 |
| KR | 101319762 B1 | 10/2013 |
| RU | 2399361 C1 | 9/2010 |
| WO | 2019088369 A1 | 5/2019 |

* cited by examiner

JUICE EXTRACTOR

CROSS-REFERENCE TO RELATED APPLICATIONS

The present application is a U.S. National Stage entry under 35 U.S.C. § 371 based on International Application No. PCT/CN2020/083498, filed on Apr. 7, 2020, which claims priority to Chinese Application No. 201910407677.X and No. 201910407676.5, titled "Juice Extractor" and "A Motor Protection Device of Juice Extractor", both filed on May 16, 2019, and both of which are hereby incorporated herein by reference in their entirety.

TECHNICAL FIELD

This Application pertains to the field of juice extractors, and particularly relates to a horizontal twin-screw juice extractor.

BACKGROUND

The conventional screw juice extractors are generally single-screw juice extractors. However, single-screw juice extractors have a low efficiency and a slow speed of juice extraction, which is difficult to satisfy the demands of users for fast-paced live.

Some twin-screw juice extractors have emerged in the market, but the conventional juice extractors have drawbacks. They usually have a big noise. The juice extraction is only by the occlusion between the threads of the two screw rods, and the juice extraction is not exhaustive, and has an unsatisfactory efficiency. Because of a poor sealing performance, the extracted juice easily passes through the rotation shaft of the electric motor, enters the electric-motor housing, and corrodes the electric motor and its reduction gearbox. Because of the part of juice extraction and the part of the machine-body base cannot disassembled conveniently, the users cannot conveniently operate and wash them, and the repairing of the juice extractors are inconvenient, which brings a high maintenance cost. In addition, other objects, desirable features and characteristics will become apparent from the subsequent summary and detailed description, and the appended claims, taken in conjunction with the accompanying drawings and this background.

SUMMARY

In view of the above problems in the prior art, the present disclosure provides a novel juice extractor, which improves the sealing of the juice extractor, reduces the manufacturing cost of the juice extractor, and facilitates the operation and maintenance by the juice extractor.

The present disclosure provides a juice extractor, wherein the juice extractor comprises a power assembly, a housing assembly, a snap-fitting assembly and a screw assembly;
 the power assembly comprises an electric motor, an electric-motor housing and a rotation shaft, and the electric motor drives the rotation shaft to rotate;
 the screw assembly is connected to the rotation shaft, and is provided inside the housing assembly;
 the snap-fitting assembly connects the housing assembly to the power assembly; and
 the housing assembly comprises a strainer assembly and a filtering-shield assembly, the strainer assembly is integrally formed by welding, the filtering-shield assembly is detachably fixed to and supported on the strainer assembly, and the filtering-shield assembly is provided with a filtered juice separating slot that is capable of performing secondary filtration of an extracted juice.

Optionally, the juice extractor comprises a machine-body base, and the machine-body base comprises two front feet that protrude forwardly.

Optionally, the screw assembly is a twin-screw assembly, wherein two screw rods are individually rotationally connected to the rotation shaft passing through a sealing connecter on the electric-motor housing and a transmission shaft provided on the sealing connecter, and the twin-screw assembly is provided inside the strainer assembly.

Optionally, the twin-screw assembly comprises a crushing part and an extruding part, the crushing part is formed by engagement of threaded tooth cutters on outer circumferences of the screw rods, the extruding part is provided at a front end of the crushing part, a diameter of the extruding part is much less than a diameter of the crushing part, and a connection between the crushing part and the extruding part is provided with steps; and the extruding part is formed by a first thread part and a second thread part, the second thread part is provided at a front end of the first thread part, and a quantity of threads of the second thread part is greater than a quantity of threads of the first thread part.

Optionally, an inclination angle of the threaded tooth cutters is 11-13 degrees; and the first thread part is formed by two threads, and the second thread part is formed by four threads.

Optionally, the strainer assembly comprises a crushing housing containing the crushing part of the twin-screw assembly, an extruding housing containing the extruding part of the twin-screw assembly, and a bellmouth part; and both of the crushing housing and the extruding housing are provided with a plurality of strainers or merely one or more extruding-housing notches are provided at a lower part of the extruding housing.

Optionally, the strainer assembly is formed by welding two strainer cylinders, sidewalls of the two strainer cylinders intersect and are communicated, screws are provided in the interiors of the strainer cylinders, a diameter of the strainer cylinders is slightly greater than a diameter of the screw rods, and gaps exist between the strainer cylinders and the screw rods.

Optionally, the sealing connecter is provided with a touch safety switch, a rear end of the strainer assembly is provided with a connecting part that is connected to the sealing connecter, a silica-gel sealing gasket is provided inside the connecting part, and the silica-gel sealing gasket is provided with a protrusion that is capable of touching the touch safety switch.

Optionally, the filtering-shield assembly is nested to the strainer assembly, the filtering-shield assembly comprises a filtering cartridge and a filter-residue separating plate, the filtered-juice separating slot is provided at a middle part of a lower part of the filtering cartridge, and the filter-residue separating plate is fixed to a front end of the filtering cartridge.

Optionally, the juice extractor further comprises a sealing connecter detachably connected to the electric-motor housing, the sealing connecter is of a solid structure, and extends forwardly in an axial direction of the electric-motor housing, and the sealing connecter is provided with a rotation-shaft hole and a sealing device.

Optionally, the sealing connecter is an aluminum die casting, and further comprises a circular disc that is connected to the electric-motor housing, and a cylinder that is provided at a front end of the circular disc.

Optionally, the sealing device comprises a silica-gel sealing sleeve, and the silica-gel sealing sleeve is of a shape of an elongate cylinder, and is provided with at least two sealing rings in an interior.

Optionally, the sealing connecter is an aluminum die casting, and further comprises a circular disc that is connected to the electric-motor housing, and a cylinder that is provided at a front end of the circular disc, a projection is provided at a front end of the cylinder, and the projection is of a shape of a horizontally placed "8" that is formed by two intersecting circular arcs, wherein a transmission shaft is provided inside a transmission-shaft hole of a central part of one of the circular arcs, and the rotation shaft is provided inside and throughout a rotation-shaft hole of a central part of the other of the circular arcs.

Optionally, the juice extractor further comprises a juice extracting mechanism, the juice extracting mechanism is a twin-screw assembly, the sealing connecter is further provided with a transmission shaft, two screw rods are provided at the rotation shaft and the transmission shaft respectively, and the transmission shaft and the sealing connecter are detachably connected.

Optionally, a touch safety switch is provided at an end of the sealing connecter, a connecting part is provided at a rear end of the strainer assembly, and a silica-gel sealing gasket inside the connecting part is provided with a protrusion that is capable of touching the touch safety switch.

Optionally, a shock resisting device is provided between a machine-body base of the juice extractor and the sealing connecter, and the shock resisting device comprises a fixed shock resistor connected to the sealing connecter and a connecter mounted to the machine-body base; and the fixed shock resistor is of an inversed U shape, two supporting feet of the inversed U shape are inclined, the connecter is of an inversed U shape having supporting feet, an upper part of the connecter is fitted to the fixed shock resistor, and the machine-body base extends forwardly to a front of the sealing connecter.

Optionally, the snap-fitting assembly comprises a sealing member, a first snap-fitting member, a second snap-fitting member, a spring, a connecter and a controlling member, one end of the first snap-fitting member and one end of the second snap-fitting member are hinged to a spring containing part on a side of the sealing member, and the controlling member is hinged to the other end of the second snap-fitting member; and one end of the connecter is hinged to the other end of the first snap-fitting member, the other end of the connecter is hinged to a middle part of the controlling member, and the spring is provided inside the spring containing part.

Optionally, the sealing member is detachably fixedly connected to a front end of the sealing connecter.

Optionally, the strainer assembly comprises a bellmouth part, a crushing housing, an extruding housing and a detachment proof part, the bellmouth part is provided at a rear end of an upper part of the crushing housing, the extruding housing is connected to a front end of the crushing housing, the detachment proof part is connected to a front end of the extruding housing, and connecting structures between the bellmouth part, the crushing housing, the extruding housing and the detachment proof part are welded structures.

Optionally, a front end of the strainer assembly further comprises a detachment proof part, a front end of the twin-screw assembly comprises a smooth shaft, and the detachment proof part contains and supports the smooth shaft.

The juice extractor of the present disclosure can obtain the following technical effects:

(1) The employed sealing connecter, instead of the commonly used welded structures, employs a detachable structure, which facilitates the dissembling and maintenance by the user, and provides a larger space for the sealing of the electric-motor housing.

(2) By using the touch safety switch, the electric motor is started up after the housing assembly has been connected and fixed to the sealing connecter, which improves electrical safety, and reduces the damage to the housing of the juice extractor.

(3) The employed snap-fitting assembly facilitates the dissembling of the housing assembly, and facilitates the operations such as washing of the housing assembly, and the snap-fitting assembly itself can be conveniently and easily used.

(4) The employed twin-screw assembly, by using the added crushing part, improves the efficiency of crushing of fruits and vegetables, to enable the juice extraction to be more sufficient, and, by providing the second thread part, intensifies the extrusion, enables the forward extrusion and propelling to be more smooth and natural, further improves the efficiency of the juice extraction, extracts juices of fruits and vegetables to the maximum extent, and facilitates the separation of the filter residue.

(5) The employed strainer assembly is integrally formed by welding, which improves the manufacturing efficiency, reduces the cost, facilitates normalized operations, facilitates the assembling, and smooths the residue discharging and the juice filtering.

(6) In the employed filtering-shield assembly, the filter-residue separating plate facilitates to guide the separation and discharging of the filter residue, and the filtered-juice separating slot realizes secondary filtration to the filtered juice, and facilitates the concentrated flowing out of the filtered juice.

BRIEF DESCRIPTION OF THE DRAWINGS

The present invention will hereinafter be described in conjunction with the following drawing figures, wherein like numerals denote like elements, and.

Figure 1:
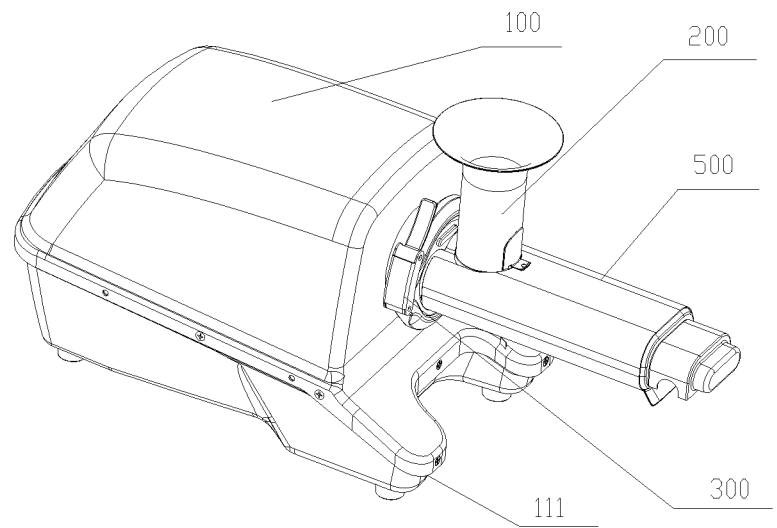
FIG. 1 is a perspective view of the horizontal twin-screw juice extractor according to an embodiment of the present disclosure.

In the drawings: 100 power assembly; 110 electric-motor housing; 111 front foot; 120 sealing connecter; 121 circular disc; 122 cylinder; 130 rotation shaft; 140 transmission shaft; 150 silica-gel sealing sleeve; 160 screw silica-gel sealing sleeve; 170 touch safety switch; 180 fixed shock resistor; 190 connecter;

200 strainer assembly; 210 bellmouth part; 220 crushing housing; 221 strainer of crushing housing; 230 extruding housing; 231 strainer of extruding housing; 232 extruding-housing notch; 240 detachment proof part; 241 containing part; 250 connecting part; 260 silica-gel sealing gasket; 270 fixing member; 280 supporting member; 290 mounting member;

300 snap-fitting assembly; 310 sealing member; 311 spring containing part; 312 protecting member; 313 bolt; 320 spring; 330 first snap-fitting member; 340 second snap-fitting member; 350 connecter; 360 controlling member;

400 twin-screw assembly; 410 crushing part; 420 extruding part; 421 first thread part; 422 second thread part; 430 smooth shaft;

500 filtering-shield assembly; 510 filtering cartridge; 520 filter-residue separating plate; 530 filtered-juice separating slot;

600 filtered-juice container; 610 handle; and 700 filter-residue container.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail in conjunction with the drawings.

A juice extractor comprises a power assembly 100, a housing assembly, a snap-fitting assembly 300 and a twin-screw assembly 400. The power assembly comprises an electric motor, an electric-motor housing 110, a sealing connecter 120, a touch safety switch 170, a rotation shaft 130 and a transmission shaft 140. The sealing connecter 120 and the electric-motor housing 110 are detachably connected. The electric motor drives the rotation shaft 130 to rotate. The touch safety switch 170, the transmission shaft 140 and the rotation shaft 130 are provided on the sealing connecter 120. The housing assembly comprises a strainer assembly 200 and a filtering-shield assembly 500. The strainer assembly comprises a vertically placed bellmouth part 210. The filtering-shield assembly 500 is nested to the strainer assembly. The snap-fitting assembly 300 snap-fits the housing assembly to the sealing connecter 120. The twin-screw assembly 400 is connected to the transmission shaft 140 and the rotation shaft 130, and is placed inside the strainer assembly 200. The twin-screw assembly comprises a crushing part 410 and an extruding part 420.

The rotation shaft 130 is a driving shaft, and the transmission shaft 140 may be a driving shaft or may also be a fixed shaft or a driven shaft.

The materials of the strainer assembly 200, the twin-screw assembly 400 and filtering-shield assembly 500 may be the stainless steels used for the food industry, for example the stainless steels of the models such as food grade 304 or food grade 316, which have a good corrosion resistance.

It should be noted that, in the following embodiments, the rear or rear end refers to the left direction in FIG. 2, and the front or front end refers to the direction of rightward extending in FIG. 2.

The First Embodiment

As shown in FIGS. 1-4, aiming at the problem that the electric motor and its reduction gearbox are easily corroded by the extracted juice that is leaked to the interior of the housing, the present embodiment provides multiple means of sealing protection for the electric motor, to avoid the electric motor from being corroded by the extracted juice. A solid inserter that is specially designed is connected to the exterior of the electric-motor housing, which improves the sealing effect, and a corresponding sealing sleeve is specially designed. In addition, the snap-fitting assembly and the strainer assembly are used to improve the sealing effect, which greatly improves the sealing effect, and obtains an outstanding technical effect.

The power assembly 100 comprises: the electric-motor housing 110. The electric motor is provided inside the electric-motor housing. The sealing connecter 120, which is specially designed and manufactured, is provided at the front end of the electric-motor housing 110. The sealing connecter 120 comprises a circular disc 121 and a cylinder 122 at the front end of the circular disc. Both of the circular disc and the cylinder are of a solid structure. The circular disc 121 is detachably connected to the front end of the electric-motor housing by using a bolt. The front end surface of the cylinder 122 is provided with a rotation-shaft hole, a transmission-shaft hole, a touch-safety-switch hole and a screw hole, in which are respectively provided the rotation shaft, the transmission shaft, the touch safety switch and the bolt. The rotation-shaft hole is a through hole. The electric motor may drive the rotation shaft to rotate. The transmission shaft is a replaceable shaft, and can be conveniently replaced after being corroded.

Optionally, the sealing connecter 120 is an aluminum die casting. The aluminum die casting can be conveniently manufactured with a low cost, and can be used without being further processed, which guarantees the manufacturing specification of the juice extractor. The detachably connection of the aluminum die casting facilitates the dissembling and maintenance by the user, and provides a larger space for the sealing of the electric-motor housing. Furthermore, aluminum has a high hardness and a small weight, and improves the overall strength. Adding the aluminum die casting into the structure mainly made of stainless steel is another important contribution of the present disclosure.

In order to enhance the sealing, in the present disclosure, all of the rotation-shaft hole, the transmission-shaft hole and the screw hole are provided with a sealing sleeve. Optionally, the material of the sealing sleeves is silica gel, the silica-gel sealing sleeves 150, 160 are cylindrical, and a plurality of sealing rings are provided in the axial direction of the cylindrical silica-gel sealing sleeves. The silica-gel sealing sleeves have a good corrosion resistance, a good flexibility and a high hardness, and by the plurality of sealings, even if an outer sealing ring is damaged, the extracted juice can be effectively prevented from infiltrating into the electric-motor housing, which increases its service life, and reduces the maintenance cost.

Optionally, each of the silica-gel sealing sleeves has at least two sealing rings, preferably six sealing rings. Providing the silica-gel sealing sleeves having six sealing rings inside the rotation-shaft hole of the sealing connecter does not only serve to seal, to prevent extracted juice from entering the electric-motor housing, but also serves to support the rotation shaft.

In order to facilitate the installation, a projection is provided at the front end of the cylinder of the sealing connecter 120. The projection is of a shape of a horizontally placed "8" that is formed by two intersecting circular arcs. The transmission shaft 140 protrudes from the central part of one of the circular arcs, and the rotation shaft 130 is provided throughout and protrudes from the central part of the other of the circular arcs. Preferably, the transmission shaft and the sealing connecter are detachably connected, which facilitates the replacement of corroded transmission shafts.

As shown in FIG. 1, aiming at the problem that conventional horizontal twin-screw juice extractors easily vibrate and displace, the machine-body base of the present disclosure comprises two front feet 111 that protrude forwardly, which effectively prevents the vibration and the displacement of the juice extractor.

In the present disclosure, further, a shock resisting device is provided between the sealing connecter 120 and the machine-body base of the juice extractor, which is mainly intended to attenuate vibration by connecting the sealing connecter and the machine-body base. The shock resisting device particularly comprises: a fixed shock resistor 180 provided at the lower end of the sealing connecter. The fixed shock resistor 180 is generally of an inversed U shape. Two supporting feet of the inversed U shape are inclined. The supporting feet are provided with connecting holes. A connecter 190 that is fitted to and connected to the fixed shock resistor is provided inside the machine-body base of the juice extractor. The connecter comprises a connecting part that is connected to the fixed shock resistor. In order to increase the contact area with the fixed shock resistor, the upper part of the connecting part is fitted to the U-shaped fixed shock resistor, the lower part of the connecter 190 is two supporting feet that are fixedly connected to the machine-body base of the juice extractor, and the connecting part is of an inversed U shape having supporting feet, thereby realizing the fitting to the fixed shock resistor 180. The sealing connecter 120, the fixed shock resistor 180 and the connecter 190 may be connected by means of detachable bolts and so on, and may also be connected by means of other modes such as riveting and welding.

Further, the machine-body base of the juice extractor extends forwardly to the front of the sealing connecter, and the shock resisting device is entirely hidden in the interior of the housing of the machine-body base.

The above structural designs of the shock resisting device and the machine-body base greatly improve the shock-resistance performance and the stabilization performance of the juice extractor, which brings unexpected technical effects.

The Second Embodiment

Figure 2:
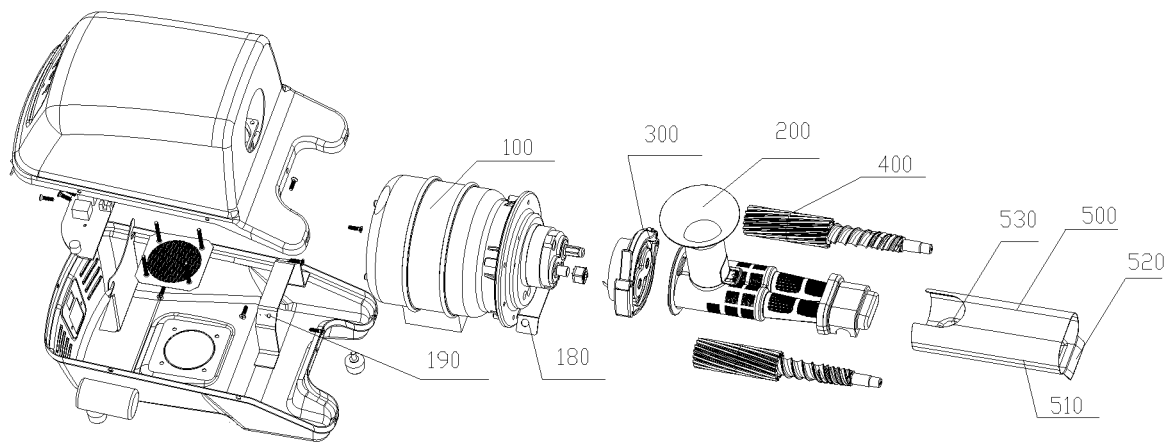
FIG. 2 is an exploded view of the horizontal twin-screw juice extractor according to an embodiment of the present disclosure.
Figure 3:
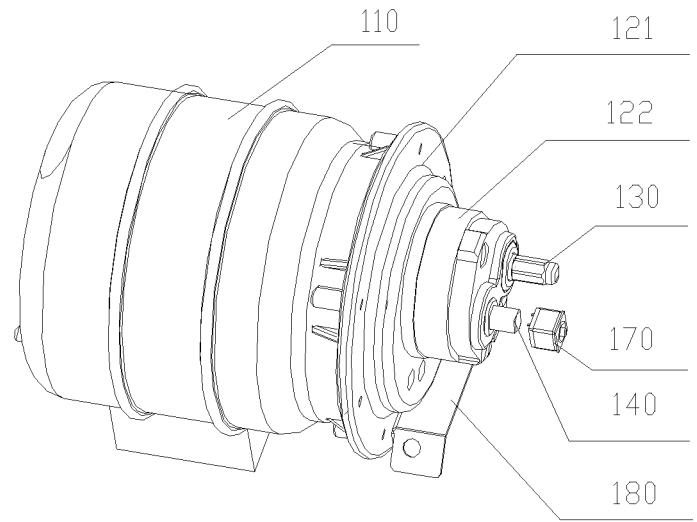
FIG. 3 is a perspective view of the power assembly according to an embodiment of the present disclosure.
Figure 4:
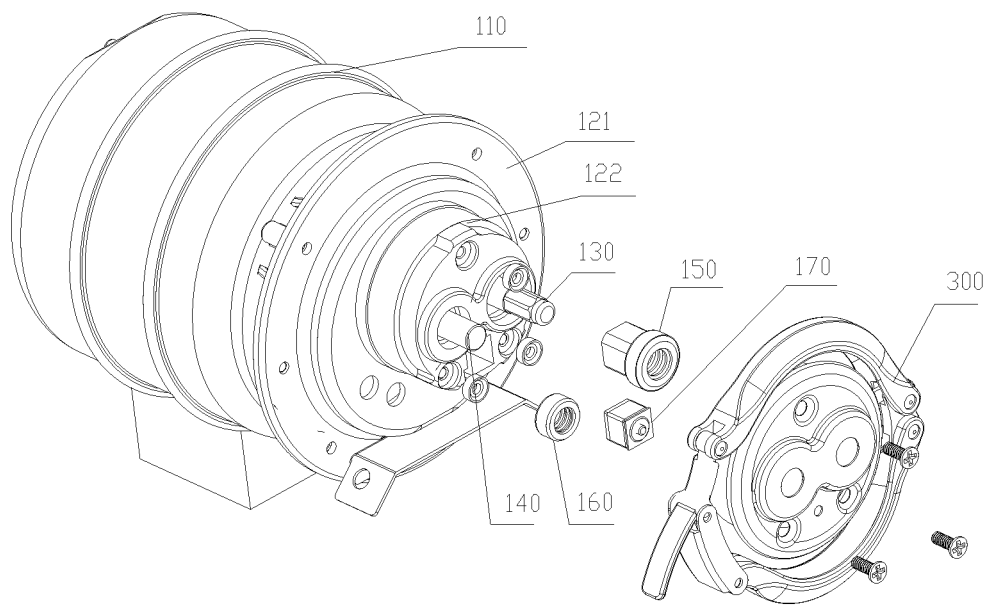
FIG. 4 is an exploded view of the power assembly according to an embodiment of the present disclosure.
Figure 5:
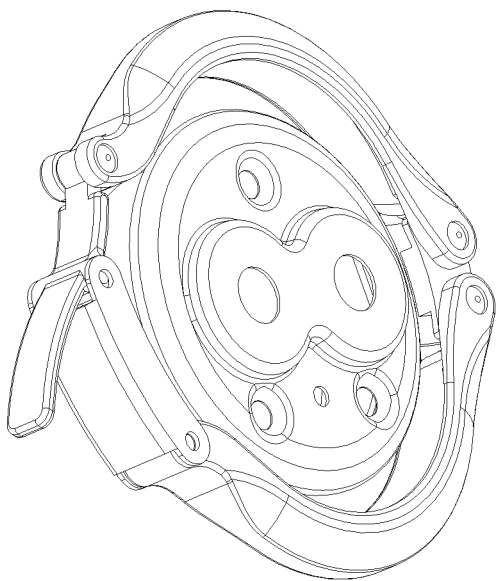
FIG. 5 is a perspective view of the snap-fitting assembly according to an embodiment of the present disclosure.
Figure 6:
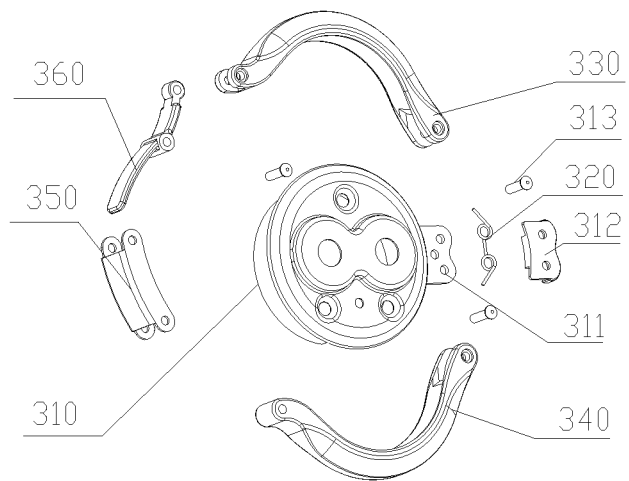
FIG. 6 is an exploded view of the snap-fitting assembly according to an embodiment of the present disclosure.

As shown in FIGS. 2, 5 and 6, the snap-fitting assembly 300 is configured to connect the strainer assembly 200 to the sealing connecter 120 of the power assembly 100. The snap-fitting assembly 300 comprises: a sealing member 310, fixedly connected to the cylinder of the front end of the sealing connecter 120, used for further sealing; a first snap-fitting member 330, having one end hinged to a spring containing part 311 on a side of the sealing member 310 by using a bolt 313; a second snap-fitting member 340, also having one end hinged to the spring containing part 311 by using a bolt, wherein both of the first snap-fitting member and the second snap-fitting member are of the shape of a circular arc; a controlling member 360, hinged to the other end of the second snap-fitting member 340; and a connecter 350, having one end hinged to the other end of the first snap-fitting member 330, and the other end hinged to the middle part of the controlling member 360. The bolt is at least two bolts, which are connected to the spring containing part 311 with a spacing therebetween, and springs are nested to the two bolts hinged to the two snap-fitting members. The positions where the first snap-fitting member 330 and the second snap-fitting member 340 are located can enclose the sealing member 310 from top and bottom, and the springs can enable the first snap-fitting member and the second snap-fitting member to automatically flick outwardly when the first snap-fitting member and the second snap-fitting member are separated.

Therefore, as shown in FIGS. 5 and 6, while the strainer assembly 200 is engaged with the power assembly 100, when the controlling member 360 is rotated, relatively to the first snap-fitting member 330, to the direction of the second snap-fitting member 340, the connecter 350 hinged to the controlling member 360 is pulled to the direction of the first snap-fitting member 330, so that the first snap-fitting member 330 and the second snap-fitting member 340 are close to each other, and when the controlling member 360 is rotated, relatively to the first snap-fitting member 330, to the direction of the first snap-fitting member 330, the connecter 350 hinged to the controlling member 360 is away from the second snap-fitting member 340, so that the first snap-fitting member 330 and the second snap-fitting member 340 are far away from each other. Slots are provided on the facing inner walls of the first snap-fitting member 330 and the second snap-fitting member 340, to facilitate to insert and cling to the ends of a connecting part 250 of the strainer assembly.

The snap-fitting assembly having a spring of the present disclosure can realize the automatic separation of the first snap-fitting member and the second snap-fitting member, which facilitates the user operation, and is provided with the sealing member clinging to the sealing connecter, to further seal and protect the electric motor.

The Third Embodiment

Figure 7A:
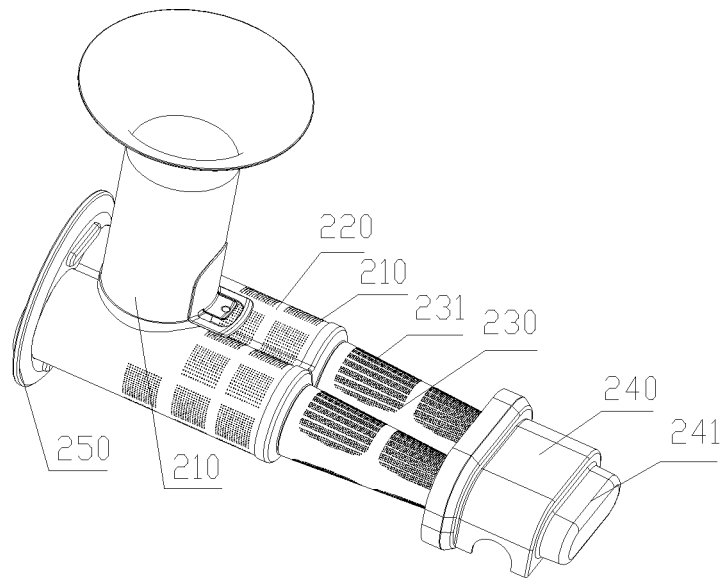
FIG. 7A is a perspective view of the strainer assembly according to an embodiment of the present disclosure.
Figure 7B:
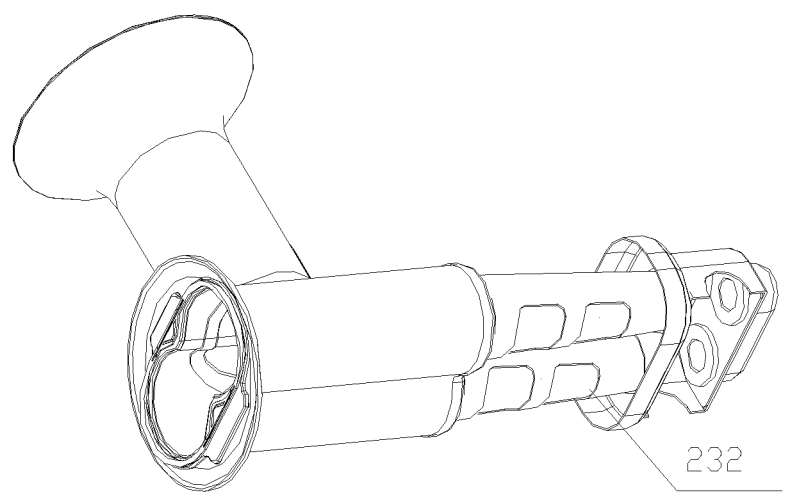
FIG. 7B is a perspective view of the strainer assembly according to another embodiment of the present disclosure.
Figure 8:
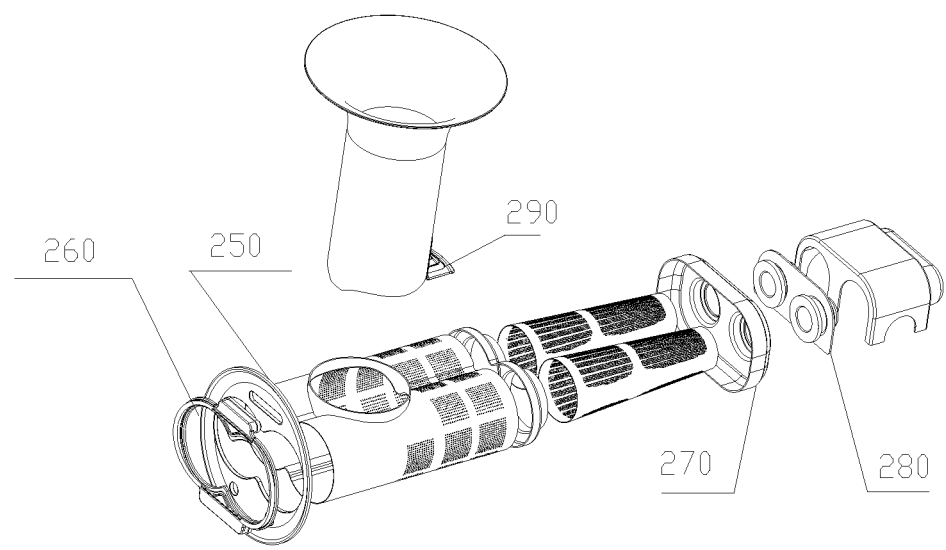
FIG. 8 is an exploded view of the strainer assembly according to an embodiment of the present disclosure.

As shown in FIGS. 7 and 8, the strainer assembly 200 of the present disclosure comprises the bellmouth part 210, a crushing housing 220, an extruding housing 230, a detachment proof part 240 and the connecting part 250. The diameter of the extruding housing 230 is obviously less than the diameter of the crushing housing 220. Steps are formed between the extruding housing and the crushing housing, for respectively containing the crushing part and the extruding part of the twin-screw assembly. The crushing housing 220 and the extruding housing 230 are respectively provided with a plurality of crushing-housing strainers that form an array, and a plurality of extruding-housing strainers that form an array.

The hollow bellmouth part 210 is provided vertically at the upper part of the crushing housing 220, for providing to the strainer assembly the raw material to be extracted for juice.

As an important innovation point, all of the components of the strainer assembly are welded, and the structure integrally formed by welding reduces the manufacturing cost, improves the manufacturing efficiency, and facilitates the operation and maintenance by the user.

The housing of the strainer assembly is formed by two strainer cylinders. The sidewalls of the two strainer cylinders intersect and are communicated. Screws are provided in the interiors of the strainer cylinders. The diameter of the strainer cylinders is slightly greater than the diameter of the screw rods.

As shown in FIGS. 2, 7A and 8, a plurality of strainers that form an array is on the crushing housing 220 in front of the bellmouth part 210. The strainers are a plurality of fine through holes. The juice extraction raw material is fed in the bellmouth 210, the juice extraction raw material is crushed by the crushing part, where the two screw rods are occluded and rotated, and simultaneously is delivered to the front, and while the juice extraction raw material is being crushed, part of the juice that flows out of the juice extraction raw material is discharged via the strainers. In the same manner, the extruding housing 230 is also provided with a plurality of strainers, for discharging the juice squeezed out by the extruding part.

The detachment proof part 240 is provided at the front end of the extruding housing 230. The rear end of the detachment proof part 240 is provided with a filtering-shield-assembly fixing member 270 and a supporting member 280 for supporting the two screw rods. The fixing member 270 is configured to position the filtering-shield assembly. The supporting member 280 is provided with two through holes, which are used to support the twin-screw assembly, and facilitate to discharge the filter residue from the strainer assembly.

A containing part 241 is provided at the front end of the detachment proof part 240. The containing part 241 is provided with two blind holes, whereby smooth shafts, which are provided at the front end of the extruding part of the twin-screw assembly, are rotatably inserted, supported and contained into the blind holes. An opening for discharging the filter residue is provided at the lower part of the detachment proof part.

The rear end of the strainer assembly is provided with the connecting part 250 that is connected to the sealing connecter 120. A silica-gel sealing gasket 260 is provided inside the connecting part 250.

As shown in FIG. 7B, the present disclosure provides another use of the strainer assembly, which use includes the squeezing that is not intended to extract juice, for example, for food materials such as fruit jam and ice cream. The strainer assembly is not provided with a strainer on the crushing housing, but merely one or more extruding-housing notches 232 are provided at a lower part of the extruding housing, to guide the squeezed fruit jam, ice cream and so on to come out. In such an operating state, the filtering-shield assembly is not required to be used in cooperation.

As an important innovation point, the present disclosure provides an electric-motor start-up safety structure, wherein the silica-gel sealing gasket 260 is provided with a protrusion that is capable of touching the touch safety switch, and the protrusion can enable the starting up of the operation of the electric motor by touching the touch safety switch 170 after the snap-fitting assembly 300 has been snap-fitted, which guarantees that merely after the snap fitting, the juice extractor can be safely started up. Furthermore, the providing of the silica-gel sealing gasket 260 further enhances the sealing of the electric motor.

The Fourth Embodiment

Figure 9:
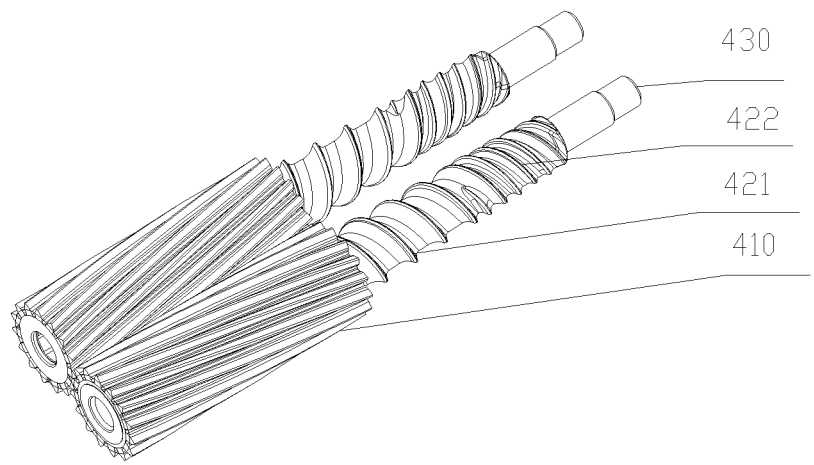
FIG. 9 is a perspective view of the twin-screw assembly according to an embodiment of the present disclosure.

As shown in FIG. 9, the twin-screw assembly comprises: the crushing part 410 and the extruding part 420. The extruding part 420 is connected to the front of the crushing part 410. The diameter of the extruding part 420 is obviously less than the diameter of the crushing part 410. The connection between the crushing part and the extruding part is provided with steps. The diameter of the extruding part 420 gradually decreases forwardly in the axial direction. The twin-screw assembly is provided inside the housing of the strainer assembly. During rotation, the crushing part is used to crush the juice extraction raw material, and the extruding part subsequently compresses the juice extraction raw material to extract juice, and simultaneously delivers it.

The crushing part 410 and the extruding part 420 of the present disclosure are formed by the spiral protrusions and slots. The cross-section of the protrusions may be any of various shapes that facilitate the crushing, extrusion and squeezing of the juice extraction materials, such as a thread shape, a rack shape and a polygonal shape.

Further, the crushing part comprises two screw rods that are respectively connected to the rotation shaft and the transmission shaft, and the two screw rods are engaged with each other via the threaded tooth cutters on the outer circumferences.

The extruding part is provided at the front end of the crushing part, the outer circumferential surfaces of its screw rods are of a thread shape, and rotation shafts are inserted into the screw rods.

Optionally, the extruding part is formed by a first thread part 421 and a second thread part 422, the two thread parts are adjacent, the second thread part is provided at the front end of the first thread part, and a quantity of threads of the second thread part is greater than a quantity of threads of the first thread part. The extra threads of the second thread part 422 form new slots and protrusions, which increases the intensity of the extrusion, and the thread parts of the two screw rods has gaps therebetween. The two thread parts are in succession connected, which reduces the compressed deformation of the strainer assembly, and the effects of the forward propelling and of the extrusion to the raw material are unexpectedly improved, whereby the overall performance of the juice extractor is greatly improved.

Optionally, the threaded tooth cutters are inclined, with an inclination angle of 8-30 degrees, so as to rapidly deliver the material forwardly while crushing.

Optionally, the first thread part is formed by two threads, and the second thread part is formed by four threads.

Further, the inclination angle of the threaded tooth cutters is between 11-13 degrees, thereby obtaining unexpected advantages in the crushing and the forward propelling. By the above extrusion intensified structure and the settings of the inclination angle and so on, the extrusion efficiency is improved from above 60% to above 90%, and the effective availability of the power of the electric motor reaches above 95%.

The present disclosure, by the sequent engagement of the first thread part and the second thread part for intensifying the extrusion, can enable the forward propelling and the juice extraction of the juice extraction material in the extruding part to be smoother, which improves the efficiency of the juice extraction, increases the juice-extraction rate, and reduces the difficulty in washing, and can reduce the pressure on the housing of the strainer assembly, which prevents the deformation of the strainer assembly, and increases the service life of the strainer assembly.

The Fifth Embodiment

Figure 10:
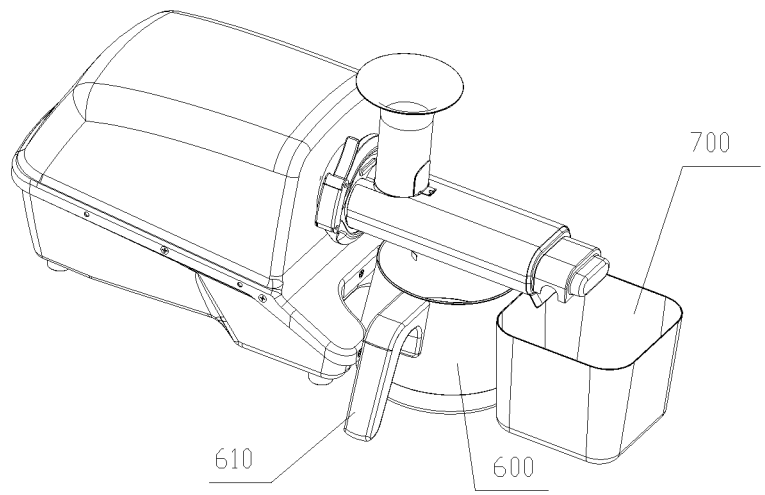
FIG. 10 is a perspective view of the operating state of the juice extractor according to an embodiment of the present disclosure.

As shown in FIGS. 2 and 10, the filtering-shield assembly 500 is nested to the strainer assembly. The filtering-shield assembly 500 comprises a filtering cartridge 510 and a filter-residue separating plate 520. A filtered-juice separating slot 530 is provided at the middle position of the lower part of the filtering cartridge. The filter-residue separating plate 520 is provided at the front end of the filtering cartridge.

The juice extractor further comprises a filtered-juice container 600 and a filter-residue container 700. The filtered-juice container is provided under the filtered-juice separating slot of the filtering-shield assembly. The filtered-juice container is provided with a handle 610.

The filtering-shield assembly can realize secondary filtration to the filtered juice, thereby improving the mouthfeel of the user, and can prevent the splashing of the juice that is discharged via the plurality of strainers, and prevent substances such as dust from entering the juice extractor.

As shown in FIG. 7, the bellmouth part 210 is provided with a filtering-shield-assembly mounting member 290, and the filtering-shield assembly is mounted to the mounting member 290 at the bellmouth part by using detachable modes such as a bolt.

The Sixth Embodiment

As shown in FIG. 10, the juice extraction raw material such as vegetables or fruits for generating a juice is placed into the bellmouth part 210, the strainer assembly and the sealing connecter 120 are snap-fitted by the controlling member 360, and then the electric motor is started up.

By the contacting between the touch safety switch 170 and the protrusion, the electric motor is started up and drives the rotation shaft, and the twin-screw assembly 400 is rotated by the driving of the rotation shaft. At this point, the crushing knives of the crushing part 410 occlude each other, and rotate along with the screw rods driven by the rotation shaft, and the screw rods connected to the transmission shaft are rotated in the opposite directions.

The juice obtained by the crushing is discharged via the plurality of strainers on the crushing housing 220, and the discharged juice is secondarily filtered by the filtered-juice separating slot 530 on the filtering shield and then falls into the filtered-juice container 600.

Then, the juice extraction material that has passed through the crushing part is pushed from the crushing housing 220 to the extruding housing 230. The juice extraction material, after being further intensively extruded by the first thread part 421 and the second thread part 422 of the extruding part 420 of the twin-screw assembly, is squeezed with juice again, which enables the juice extraction to be more sufficient, is filtered by the plurality of strainers provided on the extruding housing, is secondarily filtered by the filtered-juice separating slot 530 on the filtering shield, and finally falls into the filtered-juice container 600.

Finally, the residue that has passed through the extruding housing 230 is pushed to the detachment proof part 240, and falls into and is collected to the filter-residue container located under the detachment proof part.

The juice extractor of the present disclosure can be conveniently dissembled after the juice extraction has been completed, and by pulling the controlling member 360, the clamping of the snap-fitting member can be easily flicked by the spring. Furthermore, all of the twin-screw assembly, the strainer assembly, the filtering-shield assembly and so on are simply engaged, and can be easily separated and taken out, which facilitates washing operations.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A juice extractor, wherein the juice extractor comprises a power assembly, a housing assembly, a snap-fitting assembly and a screw assembly;
   the power assembly comprises an electric motor, an electric-motor housing and a rotation shaft, and the electric motor drives the rotation shaft to rotate;
   the screw assembly is connected to the rotation shaft, and is provided inside the housing assembly;
   the snap-fitting assembly connects the housing assembly to the power assembly; and
   the housing assembly comprises a strainer assembly and a filtering-shield assembly, the strainer assembly is integrally formed by welding, the filtering-shield assembly is detachably fixed to and supported on the strainer assembly, and the filtering-shield assembly is provided with a filtered-juice separating slot that is capable of performing secondary filtration of an extracted juice,
   the juice extractor further comprises a sealing connecter detachably connected to the electric-motor housing, the sealing connecter is of a solid structure, and extends forwardly in an axial direction of the electric-motor housing, and the sealing connecter is provided with a rotation-shaft hole and a sealing device,
   wherein a shock resisting device is provided between a machine-body base of the juice extractor and the sealing connecter, and the shock resisting device comprises a fixed shock resistor connected to the sealing connecter and a connecter mounted to the machine-body base; and the fixed shock resistor is of an inversed U shape, two supporting feet of the inversed U shape are inclined, the connecter is of an inversed U shape having supporting feet, an upper part of the connecter is fitted to the fixed shock resistor, and the machine-body base extends forwardly to a front of the sealing connecter.

2. The juice extractor according to claim 1, wherein the juice extractor comprises a machine-body base, and the machine-body base comprises two front feet that protrude forwardly.

3. The juice extractor according to claim 2, wherein the screw assembly is a twin-screw assembly, wherein two screw rods are rotationally connected to the rotation shaft passing through a sealing connecter on the electric-motor housing and a transmission shaft on the sealing connecter respectively, and the twin-screw assembly is provided inside the strainer assembly.

4. The juice extractor according to claim 3, wherein the twin-screw assembly comprises a crushing part and an extruding part, the crushing part is formed by engagement of threaded tooth cutters on outer circumferences of the screw rods, the extruding part is provided at a front end of the crushing part, a diameter of the extruding part is much less than a diameter of the crushing part, and a connection between the crushing part and the extruding part is provided with steps; and the extruding part is formed by a first thread part and a second thread part, the second thread part is provided at a front end of the first thread part, and a quantity of threads of the second thread part is greater than a quantity of threads of the first thread part.

5. The juice extractor according to claim 4, wherein an inclination angle of the threaded tooth cutters is 11-13 degrees; and the first thread part is formed by two threads, and the second thread part is formed by four threads.

6. The juice extractor according to claim 3, wherein the strainer assembly comprises a crushing housing containing the crushing part of the twin-screw assembly, an extruding housing containing the extruding part of the twin-screw assembly, and a bellmouth part; and both of the crushing housing and the extruding housing are provided with a plurality of strainers or merely one or more extruding-housing notches are provided at a lower part of the extruding housing.

7. The juice extractor according to claim 3, wherein the strainer assembly is formed by welding two strainer cylinders, sidewalls of the two strainer cylinders intersect and are communicated, screw rods are provided in the interiors of the strainer cylinders, a diameter of the strainer cylinders is slightly greater than a diameter of the screw rods, and gaps exist between the strainer cylinders and the screw rods.

8. The juice extractor according to claim 3, wherein the sealing connecter is provided with a touch safety switch, a rear end of the strainer assembly is provided with a connecting part that is connected to the sealing connecter, a silica-gel sealing gasket is provided inside the connecting part, and the silica-gel sealing gasket is provided with a protrusion that is capable of touching the touch safety switch.

9. The juice extractor according to claim 1, wherein the filtering-shield assembly is nested to the strainer assembly, the filtering-shield assembly comprises a filtering cartridge and a filter-residue separating plate, the filtered-juice separating slot is provided at a middle part of a lower part of the filtering cartridge, and the filter-residue separating plate is fixed to a front end of the filtering cartridge.

10. The juice extractor according to claim 1, wherein the sealing connecter is an aluminum die casting, and further comprises a circular disc that is connected to the electric-motor housing, and a cylinder that is provided at a front end of the circular disc.

11. The juice extractor according to claim 1, wherein the sealing device comprises a silica-gel sealing sleeve, and the silica-gel sealing sleeve is of a shape of an elongate cylinder, and is provided with at least two sealing rings in an interior.

12. The juice extractor according to claim 1, wherein the sealing connecter is an aluminum die casting, and further comprises a circular disc that is connected to the electric-motor housing, and a cylinder that is provided at a front end of the circular disc, a projection is provided at a front end of the cylinder, and the projection is of a shape of a horizontally placed "8" that is formed by two intersecting circular arcs, wherein a transmission shaft is provided inside a transmission-shaft hole of a central part of one of the circular arcs, and the rotation shaft is provided inside and throughout a rotation-shaft hole of a central part of the other of the circular arcs.

13. The juice extractor according to claim 1, wherein the juice extractor further comprises a juice extracting mechanism, the juice extracting mechanism is a twin-screw assembly, the sealing connecter is further provided with a transmission shaft, two screw rods are respectiively provided at the rotation shaft and the transmission shaft, and the transmission shaft and the sealing connecter are detachably connected.

14. The juice extractor according to claim 1, wherein a touch safety switch is provided at an end of the sealing connecter, a connecting part is provided at a rear end of the strainer assembly, and a silica-gel sealing gasket inside the connecting part is provided with a protrusion that is capable of touching the touch safety switch.

15. The juice extractor according to claim 1, wherein the snap-fitting assembly comprises a sealing member, a first snap-fitting member, a second snap-fitting member, a spring, a connecter and a controlling member, one end of the first snap-fitting member and one end of the second snap-fitting member are hinged to a spring containing part on a side of the sealing member, and the controlling member is hinged to the other end of the second snap-fitting member; and one end of the connecter is hinged to the other end of the first snap-fitting member, the other end of the connecter is hinged to a middle part of the controlling member, and the spring is provided inside the spring containing part.

16. The juice extractor according to claim 15, wherein the sealing member is detachably fixedly connected to a front end of the sealing connecter.

17. The juice extractor according to claim 1, wherein the strainer assembly comprises a bellmouth part, a crushing housing, an extruding housing and a detachment proof part, the bellmouth part is provided at a rear end of an upper part of the crushing housing, the extruding housing is connected to a front end of the crushing housing, the detachment proof part is connected to a front end of the extruding housing, and connecting structures between the bellmouth part, the crushing housing, the extruding housing and the detachment proof part are welded structures.

18. The juice extractor according to claim 17, wherein a front end of the strainer assembly further comprises a detachment proof part, a front end of the twin-screw assembly comprises a smooth shaft, and the detachment proof part contains and supports the smooth shaft.

* * * * *